United States Patent

[11] 3,600,725

| [72] | Inventor | James I. McCartney<br>302-117 Nymark Ave., Willowdale, Ontario, Canada |
|---|---|---|
| [21] | Appl. No. | 856,057 |
| [22] | Filed | Sept. 8, 1969 |
| [45] | Patented | Aug. 24, 1971 |

[54] PNEUMATIC SUPPORT FOR AUTOMOBILE REAR SEATS
1 Claim, 4 Drawing Figs.

[52] U.S. Cl. .................................. 5/94, 5/348, 5/357, 108/44
[51] Int. Cl. .................................. A47c 27/08
[50] Field of Search .................................. 312/235 A; 5/94, 348, 357; 108/44, 45, 46, 112; 297/250, 414, 232

[56] References Cited
UNITED STATES PATENTS

| 2,648,072 | 8/1953 | De Blieux | 5/94 |
| 2,650,374 | 9/1953 | Pierce | 5/94 |
| 3,029,109 | 4/1962 | Nail | 297/461 |
| 3,419,309 | 12/1968 | Smith | 5/348 |

Primary Examiner—Bobby R. Gay
Assistant Examiner—Darrell F. Marquette
Attorney—Kent & Ade ABSTRACT: A low-pressure pneumatic cell for automobile rear seats which has a well portion and a seat portion with a padded panel covering the seat portion.

INVENTOR.
James I. McCartney
BY
Kent + Ade

PNEUMATIC SUPPORT FOR AUTOMOBILE REAR SEATS

This invention relates to new and useful improvements in pneumatic supports and the like particularly suited for use with automobile rear seats.

When relatively small children are travelling in the rear seat of automobiles, they are often provided with mattresses and the like supported at the rear end upon the rear seat and by the front end upon suitcases or the like. This is in order to provide a relatively flat surface upon which the children may play or rest during relatively long trips.

Such mattresses are inconvenient not only because it is difficult to maintain them in an exact level position but also because it is rare to find a mattress of the exact dimensions required in order to eliminate any spaces through which the child may fall and injure himself.

Another disadvantage of such mattresses and the like is the fact that it is difficult to fold them up into a relatively small space when not in use.

The provision of a pneumatic cell overcomes these disadvantages inasmuch as it can easily be designed to cover the entire seat and floor area but also can be deflated and folded into a relatively small space when not in use.

However, such cells require relatively high pressure in order to provide a stable upper surface upon which small children may walk or play and there is an inherent danger in such high-pressure cells in that they may be ruptured inadvertently with what might be termed explosive force.

Furthermore in order to build such cells to stand relatively high pressure, the seams have to be not only adhesively secured together but also sewed and taped and it is desirable that the material be of reinforced fabric in order to withstand such pressures.

The device hereinafter to be described overcomes this disadvantage also inasmuch as a relatively low-pressure cell can be utilized, the upper surface supplied with a rigid panel covered with a padded portion so that the load thereupon is spread over a relatively large surface. This means that low pressures can be used thus eliminating any danger and permitting the device to be made from relatively lightweight material. Furthermore, I include means whereby this upper panel can be folded when the device is deflated thus enabling it to be stored in a relatively small space.

Due to the provision of the padded upper panel, there is no danger of children being bounced from their feet by the resiliency of the inflated cell.

Another object of the invention is to provide a device of the character herewithin described which is simple in construction, economical in manufacture, and otherwise well suited to the purpose for which it is designed.

With the foregoing in view, and such other or further purposes, advantages or novel features as may become apparent from consideration of this disclosure and specification, the present invention consists of, and is hereby claimed to reside in, the inventive concept which is comprised, embodied, embraced, or included in the method, process, construction, composition, arrangement or combination of parts, or new use of any of the foregoing, of which concept, one or more specific embodiments of same are herein exemplified as illustrative only of such concept, reference being had to the accompanying figures in which:

In the drawings like characters of reference indicate corresponding parts in the different figures.

Figure 1:
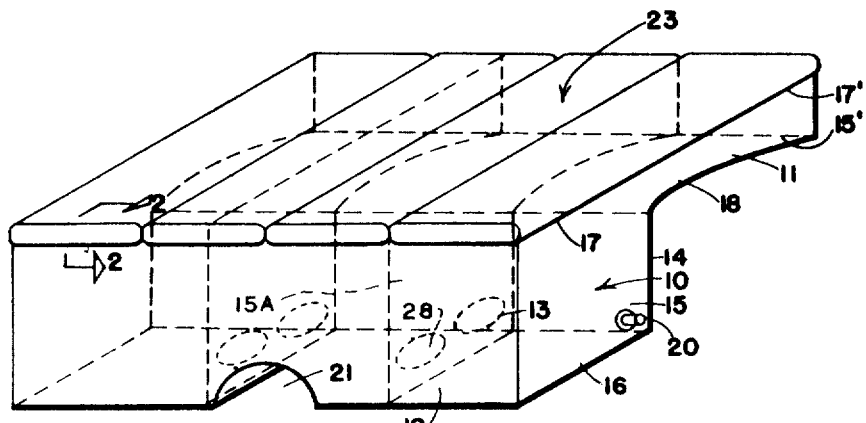
FIG. 1 is an isometric view of the device shown in the inflated position.
Figure 3:
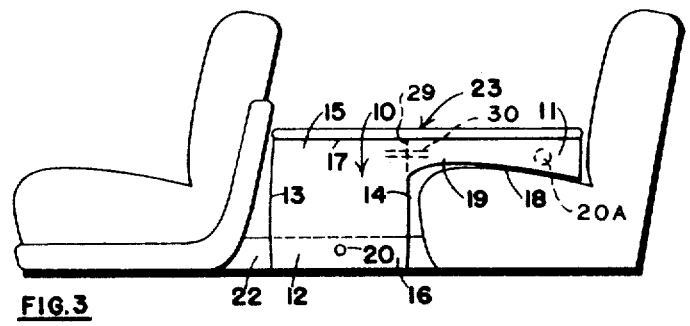
FIG. 3 is a partially schematic side elevation showing the front and rear seats of an automobile with the device in position, reduced in scale with reference to FIG. 1.

Proceeding therefore to describe the embodiment shown in FIGS. 1 and 3, reference should first be made to FIG. 1 in which 10 illustrates generally a low-pressure inflatable cell manufactured from plastic film or some similar relatively lightweight material. The seams, which are not illustrated, can be adhesively secured together or, alternatively, can be heat-sealed as desired.

The cell 10 includes a seat-engaging portion 11 and a floor-engaging portion 12 manufactured as one unit. The floor-engaging portion includes a relatively rectangular front side 13, a rear side 14, end panels 15 and a base or under side 16. The upper surface 17, which completes the floor-engaging portion, extends to form the upper surface 17: of the rear seat-engaging portion 11. In a similar manner the sidewalls 15: of the seat-engaging portion 11 may be formed as extensions of the sidewalls 15. The under surface 18 of the seat-engaging portion is arcuately curved in a concave manner to suit the convex curvature of the conventional rear seat 19 shown in side elevation in FIG. 3.

An inflation and deflation valve 20 is provided at any convenient location within one of the walls of the cell 10.

A substantially semicylindrical recess 21 extends from the front to rear of the floor engaging portion and upon the under side 16 thereof to engage over the conventional semicylindrical floor tunnel 22 normally extending upwardly from the floor of a conventional automobile.

A load-supporting panel component collectively designated 23 is secured to the common upper surface 17 and 17: of the two portions of the cell. This load-supporting panel component preferably includes a plurality of substantially rectangular boards 24 manufactured from plywood or fiberboard or the like, and these are adhesively secured to the film material forming the upper surface 17 and 17:.

Pads of resilient foam material or the equivalent 25, are placed upon each of the boards or panels 24 and these may be placed within plastic or similar material 26 in the conventional manner thus giving a padded resilient surface which is planar when the cell is inflated as shown in FIG. 1. However, the formation of the upper load supporting panel component in a plurality of panels, enables the panels to be folded in overlapping relationship with one another after the cell has been deflated and enclosing the material forming the cell therebetween so that the entire device takes up a relatively small amount of space and can therefore be stored away when not in use.

Figure 4:
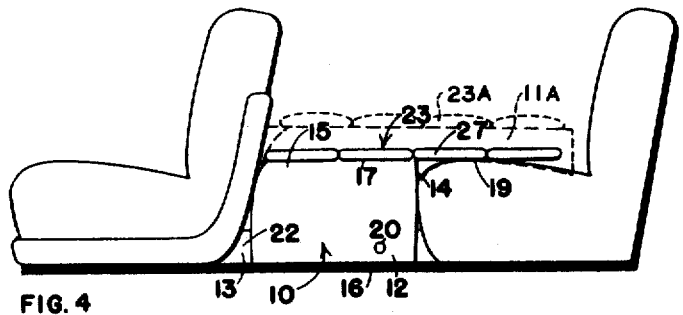
FIG. 4 is a view similar to FIG. 3 but showing an alternative embodiment of the device.
Figure 2:
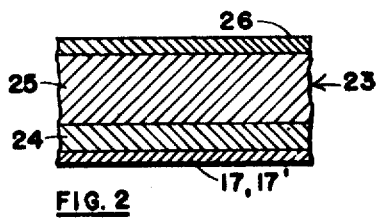
FIG. 2 is an enlarged fragmentary section along the line 2—2 of FIG. 1.

FIG. 4 shows an alternative embodiment in which the cell 10 consists only of the floor-engaging portion 15. In this embodiment the upper load-supporting panel component 23 is secured to the upper panel 17 in the manner hereinbefore described but extends rearwardly in the form of a seat-engaging portion 27 which just rests upon the upper surface of the rear seat 19 as clearly shown. This preferably is manufactured from a plurality of elongated rectangular panels running in a direction at right angles to those shown in FIG. 1 thus facilitating the folding action for storage purposes.

Shown in phantom in FIG. 1 is a desirable modification which consists of flexible baffle panels 15A having the same configuration as the end panels 15 and being secured from front to back of the device thus dividing the cell into a plurality of chambers. Means are provided to allow slow transfer of air between the chambers, said means taking the form of small apertures 28 formed in the baffles 15A. Alternatively one of the seams of the baffle to the inner surface of the cell may be noncontinuous to provide the same slow controlled transfer.

FIG. 3 shows further embodiments in phantom. First the seat portion 11 is separated from the main portion 12 by means of a transverse baffle 29 also having an air transfer aperture 30 therein.

Alternatively the two portions may be completely separate whereupon the seat portion 11 would have to be provided with its own inflation valve 20A.

FIG. 4 shows a still further embodiment in which the seat portion 11A consists of resilient material such as foam or urethane or the like, it being understood that the main portion 12 is a low pressure cell as hereinbefore described. In this embodiment the upper panels 23A extend over the front cell 12 and the resilient seat portion 11A.

Various modifications can be made within the scope of the inventive concept which is herein disclosed and/or claimed.

What I claim to be the present invention is:

1. An inflatable support device for positioning between the front and back seats and on the back seat of an automobile, said device comprising a pneumatic cell of flexible material adapted to be positioned between the seats and having an integral extension adapted to rest on the back seat, said cell including said extension thereof having a continuously flat top wall, and a cushioned load-supporting panel secured to said top wall of the cell and extension, said panel being formed from a plurality of contiguous panel sections each individually secured to said top wall of the cell and extension so that the flexible material of the top wall constitutes hinge means between the panel sections and facilitates folding thereof when the cell and extension are deflated.